(12) United States Patent
Lefkowitz

(10) Patent No.: US 8,700,459 B2
(45) Date of Patent: Apr. 15, 2014

(54) METHOD AND APPARATUS FOR SELLING INTERNATIONAL TRAVEL TICKETS IN COMBINATION WITH DUTY FREE GOODS

(76) Inventor: Yisroel Lefkowitz, Brooklyn, NY (US)

(*) Notice: Subject to any disclaimer, the term of this patent is extended or adjusted under 35 U.S.C. 154(b) by 2309 days.

(21) Appl. No.: 09/729,984

(22) Filed: Dec. 5, 2000

(65) Prior Publication Data

US 2001/0037250 A1    Nov. 1, 2001

Related U.S. Application Data

(60) Provisional application No. 60/200,325, filed on Apr. 28, 2000.

(51) Int. Cl.
 *G06Q 30/00* (2012.01)
(52) U.S. Cl.
 USPC .............. 705/14.34; 705/14.1; 705/14.11; 705/14.33
(58) Field of Classification Search
 USPC ........ 705/26, 27, 14, 5, 6, 14.1, 14.11, 14.34, 705/14.35, 26.1
 See application file for complete search history.

(56) References Cited

U.S. PATENT DOCUMENTS

| | | | |
|---|---|---|---|
| 5,297,026 A | | 3/1994 | Hoffman |
| 5,483,444 A | | 1/1996 | Heintzeman et al. |
| 5,732,398 A | * | 3/1998 | Tagawa ............................. 705/5 |
| 6,102,331 A | * | 8/2000 | Hong ........................ 244/114 R |
| 6,119,099 A | * | 9/2000 | Walker et al. ................... 705/16 |
| 6,134,534 A | | 10/2000 | Walker et al. |
| 6,694,300 B1 | * | 2/2004 | Walker et al. ................... 705/14 |
| 6,847,965 B2 | * | 1/2005 | Walker et al. ..................... 707/5 |
| 6,970,837 B1 | * | 11/2005 | Walker et al. ................... 705/26 |
| 7,072,850 B1 | * | 7/2006 | Van Luchene .................. 705/14 |
| 2002/0055906 A1 | * | 5/2002 | Katz et al. ....................... 705/39 |

OTHER PUBLICATIONS

No Author listed, "'Duty-Free' Marketing War Flares up at Airport", Korea Times, Mar. 16, 1999.*
Gould, Lark Ellen, "Do Buy! (shopping in tax-free zone of Dubai)", Travel Agent, v.294, n. 4, p. 88, Mar. 1, 1999.*
No Author listed, "Air France Corrects and Replaces Previous Announcement", Business Wire, Jan. 23, 1996.*
Ong-Yeoh, David, "Golden Boutique Set to Boost MAS Revenue", Business Times (Malaysia), p. 2, Aug. 26, 1995.*
Hoverspeed Launches Music Promo. Marketing Week v18, n17 (Jul. 7, 1995):34.
An Inside Look at Duty-Free; McConville, Daniel J.; World Trade v8, n4 (May 1995):93.

(Continued)

Primary Examiner — Raquel Alvarez
(74) Attorney, Agent, or Firm — Ostrow Kaufman LLP

(57) ABSTRACT

A method and apparatus for selling a combination of travel tickets and consumer items to customers and, in particular, for selling international travel tickets and duty free items to international travelers. By acquiring surplus international travel tickets in bulk at discounted prices and by selling the duty free items in a way which avoids the overhead typically associated with such sales, the selling merchant is able to offer the combination of an international travel ticket and a duty free item to a consumer at a price below what the consumer would pay if the consumer separately acquired the ticket and duty free item from third parties. In one implementation, the selling merchant offers the consumer a free duty free item upon purchase of an international travel ticket, or vice versa. In a preferred embodiment, both the consumer and the selling merchant employ computers communicating over a computer network to carry out the inventive method.

29 Claims, 10 Drawing Sheets

(56) References Cited

OTHER PUBLICATIONS

Teaching an Old Dog New Tricks; Moukheiber, Zina; Forbes v 156, n12 (Nov. 20, 1995):124-126.
Has the Ship Come in for Travel Retailing?; Marsh, Harriet; Marketing (Nov. 30, 1995):9.
Tax-free Market is Flying High; Rickard, Paul; Marketing Week v20, n9 (May 29, 1997):38-39.
Le Shuttle Plans Duty-Free Drive; Rogers, Danny; Marketing (Bed 12, 1998):5.
Le Shuttle Takes Changes on Board; Rogers Danny; Marketing (Feb. 19, 1998):21.
BAA Online Project Moves to Interfocus; Marketing (May 27, 1999):11.
Life After the Death of Duty Free; Campbell, Lisa; Marketing (Jul. 1, 1999):22-23.
Duty-Free Shop Puts Out Welcome Sign; Business Korea v16, n (Aug. 1999):57.

\* cited by examiner

220 INVENTORY DATABASE

| ITEM NUMBER | DESCRIPTION | WEIGHT | DUTY FREE RETAIL | LOCAL RETAIL | RESTRICTION | IMAGE |
|---|---|---|---|---|---|---|
| 101234 | CHANEL #5 EDT PERFUME 1.7 OZ | 2 OZ | $60.00 | $75.00 | ONE PER ORDER | |
| 101233 | RAYMOND WIEL WATCH | 5 OZ | $250.00 | $300.00 | 2 PER CUSTOMER | |
| 101232 | CHIVAS REGAL 1 LITER | 3 LBS | $21.00 | $30.00 | 2 PER CUSTOMER EACH WAY | |
| 101231 | SWATCH WATCH | 4 OZ | $50.00 | $55.00 | 2 PER CUSTOMER UNLESS | |
| 101230 | Mont Blanc Pen | 1 OZ | $200.00 | $300.00 | 3 PER CUSTOMER EACH WAY | |
| 101229 | CHRISTIAN DIOR SCARF | 1 OZ | $100.00 | $175.00 | ONE PER ORDER | |
| 101228 | MOUNT GAY RUM 1 CASE | 18 LBS | $65.00 | $102.00 | 1 PER CUSTOMER EACH WAY | |

CLICK HERE FOR TERMS AND CONDITIONS OF TRANSACTION

HOME | SELECT GOODS | SELECT TICKETS | CANCEL | GO TO ORDER

FIG. 3

FLIGHT SCHEDULE DATABASE

225

| DEPARTING AIRPORT | DESTINATION AIRPORT | DATE | TIME OF DEPARTURE | FLIGHT NUMBER | AIRLINE | DOLLAR VALUE REQUIRED TO QUALIFY FOR FREE TICKET |
|---|---|---|---|---|---|---|
| JFK NY | CDG PARIS | 12/12/00 | 12:00PM | 1010 | AA | $ 750.00 |
| JFK NY | OHR LONDON | 01/01/01 | 6:00PM | 1011 | DL | $ 950.00 |
| JFK NY | XX BANGALORE | 01/05/01 | 8:00AM | 385 | TWA | $ 1,325.00 |
| JFK NY | LEJ LEIPZIG | 01/06/01 | 9:30PM | AX/45 | VA | $ 975.00 |
| LAG NY | GAH GAYNDAH | 01/06/01 | 6:30AM | 532 | QU | $ 1,500.00 |
| LAG NY | GDL GUADLJR | 01/06/01 | 10:00PM | 1801 | AM | $ 375.00 |

CLICK HERE FOR TERMS AND CONDITIONS OF TRANSACTION

[HOME] [SELECT GOODS] [SELECT TICKETS] [CANCEL] [GO TO ORDER]

FIG. 4

PURCHASE ORDER # 50100
FLIGHT: TWA 3230
FROM: New York
TO: London
AT: 3 PM 01/01/01

DATE OF ORDER

| ITEM NUMBER | DESCRIPTION | DUTY FREE RETAIL | LOCAL RETAIL | RESTRICTIONS | QTY | BACK ORDER | TOTAL ORDER |
|---|---|---|---|---|---|---|---|
| 101234 | CHANEL # 5 EDT PERFUME 50 ML | $60.00 | $75.00 | ONE PER ORDER | 1 | 0 | $60.00 |
| 101233 | RAYMOND WIEL WATCH | $250.00 | $300.00 | 2 PER CUSTOMER | 2 | 0 | $500.00 |
| 101232 | CHIVAS REGAL 1 LT | $21.00 | $30.00 | 2 PER CUSTOMER | 2 | 0 | $42.00 |
| SURCHARGE | | | | | | | $ 0.00 |

TOTAL WEIGHT  6 LBS    2 BAGS  4/2 LBS        TOTAL ORDER  $ 602.00

CLICK (HERE) FOR TERMS AND CONDITIONS OF TRANSACTION (HOME)  (SELECT GOODS)  (SELECT TICKETS)  (CANCEL)  (ACCEPT ORDER)

FIG. 5

Customer Database

| NAME | ADDRESS | E-MAIL | CREDIT CARD TYPE NUMBER | PASSPORT | CUSTOMER ID |
|---|---|---|---|---|---|
| John Wilbur | 45 Main St. New York, New York 10010 | johnwil@company.com | VISA 1111 1111 1111 1111 | 11111111 | 10000 |
| Charles Smith | 300 Hope St. Providence, R.I. 02880 | charles882@aol.com | MC 1133 1111 1111 1111 | 11111118 | 10001 |
| Fred Williams | 283 85th Street West New York, New York 10011 | quixote@erols.com | CB 1111 1111 1111 1111 | 11111117 | 10002 |
| ... | ... | ... | ... | ... | ... |
| ... | ... | ... | ... | ... | ... |

FIG. 6

METHOD AND APPARATUS FOR SELLING INTERNATIONAL TRAVEL TICKETS IN COMBINATION WITH DUTY FREE GOODS

BACKGROUND OF THE INVENTION

1. Field of the Invention

The present invention pertains to a method and apparatus for selling merchandise, and particularly to a method and apparatus for selling duty free merchandise in combination with travel tickets.

2. Description of the Related Art

Duty free shopping is a multi-national business with substantial revenues. In the year 2000 alone, worldwide duty free sales are estimated at $21 billion. While the market for duty free goods is substantial and growing, duty free shopping is a relatively recent development, having its origins in so-called "export stores" first established in Ireland in the 1940s. In the ensuing years, most governments enacted laws authorizing and regulating duty free shopping within their borders. Initially, duty free shops offered only items that were subject to high import taxes, such as liquor and cigarettes. However, duty free merchants soon recognized the potential for selling a wide range of luxury goods to international travelers, and over time many additional items have become available as duty free merchandise, including jewelry, watches, perfume, cosmetics, cameras, electronic goods, etc. With help form world-renowned fashion houses such as Dior® and Chanel®, today duty free shops are international showcases for first class luxury goods. International travelers, in turn, have come to appreciate the quality of the shops and often take advantage of them during airport delays and even preplanned duty free shopping trips.

Initially, most duty free operators were local merchants who secured space at airports through personal contacts. However, airports came to realize the revenue potential of such shops and began enlarging the shopping areas for international travelers. To maximize revenue, airport management eventually began issuing requests for proposals (RFP) from persons seeking to operate duty free airport shops. The response was substantial and since then the size and number of duty free shops has expanded significantly at airports throughout the world. The potential value of a particular duty free shop will, of course, depend on a number of factors, such as the total number of international passengers enplaning at that airport, the number of international routes, the frequency of flights, the airlines that utilize the facility, e.g., upscale, leisure, charter, the location of the store relative to the gate area where passengers enplane, the local prices for comparable merchandise, the prices for the goods at the usual travel destinations, the duty or tax, if any, which the passenger may have to pay at the travel destination, the projected increase or decrease in international travelers at the airport, and the length of the lease. The revenue paid by the operator of the duty free store to the airport varies widely depending on these and other factors. Oftentimes the arrangement includes a minimum rent plus a percentage of sales.

Airlines have also sought to profit from the duty free shopping boom by selling duty free merchandise in-flight. Typically the duty free merchandise is retained on one or more trolleys which are wheeled up and down the aisles by flight personnel at preset times. The merchandise and pricing may be in a brochure shown by flight personnel to passengers expressing an interest, or it may be in a catalog at each passenger seat, or both. Travelers purchasing merchandise typically pay in cash, checks or by credit card, though checks and credit card sales carry a risk as in-flight verification that an account is in good standing is difficult.

The particular assortment of goods on the trolleys varies depending on the carrier and the route. For example, presently one airline's most expensive item is a Hermes scarf which sells for $265.00, whereas another airline lists a Bvlgari watch which sells for about $1,000.00 at current exchange rates. Some airlines operate their own in-flight trolleys and keep the revenue, though typically a percentage of sales is paid to flight personnel as a commission. Other airlines, particularly those in North and South America, outsource their in-flight duty free sales programs, just as they do with other services, such as meal preparation. When in-flight duty free sales are operated by a third party provider, the provider typically pays the airline a negotiated percentage of sales depending on the commission paid to the flight crew and other factors.

Some in-flight programs offer passengers the option of pre-ordering merchandise from a special catalog of duty free merchandise. In one variation, catalogs are forwarded to international travelers sufficiently in advance of departure such that orders can be placed and fulfilled by the departure date, with the merchandise being delivered to the passenger during flight. In another variation, catalogs are presented to international travelers on their outbound flights, and ordered merchandise is awaiting them on their return flights. These programs have the advantage that the program provider can offer the traveler a wider range of merchandise than is available on the trolley, and it minimizes the amount of inventory that the provider must maintain While all these modes of duty free shopping have had various degrees of success, they also have inherent shortcomings. For example, duty free shops face the problem of late arriving passengers, international travelers spending more time clearing security, and increased pressure on airlines to meet scheduled departure times, all of which contribute to international travelers spending less time in airport duty free shops. In-flight trolleys have a limited amount of space for showcasing goods and can carry only a limited amount of merchandise. Such trolleys also face strong competition from duty free shops, which can display and inventory a much wider range of goods. Duty free catalogs forwarded to passengers before flight face passengers who may not be at the mailing address when the catalog arrives, difficulty distinguishing their catalogs from the multitude of other catalogs which flood the mails, passengers who purchase their tickets too close to flight time to receive the catalog before departure, and passengers who subsequently cancel their flights, all of which reduce sales and/or increase expenses. Catalogs delivered in-flight for product delivery upon return solve some of these problems, but this approach is useless for passengers traveling one way or those purchasing gifts for persons at the flight destination, and also fail to satisfy the traveler's desire for immediate gratification. Furthermore, all duty free shopping suffers from the perception among many travelers that duty free prices are high, which, excepting for catalogs forwarded to the traveler prior to flight, results, in part, from the traveler's inability to compare the duty free price with prevailing retail prices.

While much duty free shopping targets international airline travelers, duty free shopping is also available to international travelers traveling by boat and even land. Cruise lines, for example, market duty free goods using many of the same techniques employed by the airlines. Techniques for marketing to persons traveling internationally by land (e.g., train, bus, etc.) are necessarily more limited, and typically focus on shops at the exit point from the country where the goods are sold.

Most countries have enacted detailed laws and regulations which enable and regulate duty free shopping within their borders. Essentially, duty free shopping works as follows. A merchant desiring to sell foreign made or domestic duty free goods purchases such goods from the manufacturer, either directly or through a distributor. As long as such goods are retained for export only, they are exempt from customs duties and as well as federal, state and local taxes. The shops from which merchants sell such goods are known as duty free or tax free shops, however both are the same, the former referring to the exemption from customs' duties upon export, and the latter referring to the exemption from government taxes imposed by the country in which the shop is situated. As used herein, "duty free" refers to sales which are exempt from customs' duties and/or taxes.

For example, the merchant may purchase foreign-made ties, jewelry, watches, liquor, handbags, etc. and then import those goods into the country from which the duty free sales will be made. Upon export following sale, no duty or tax is paid by the merchant on such imported goods provided, prior to sale, the goods are maintained in a bonded facility sanctioned for that purpose by the government and provided the merchant complies with all applicable regulations governing such facilities. Alternatively, or in addition, the merchant may purchase domestic goods. While domestic goods would not, in any event, be subject to duty upon sale, they are typically taxed when sold. However, provided they are maintained in a bonded facility of the type described above, domestic goods are exempt from tax upon export, which is particularly attractive in the case of goods which command a luxury tax when sold domestically, such as alcohol and cigarettes. In fact, merchants selling domestic goods duty free can typically acquire such goods from manufacturers at prices below, and sometimes well below, the prices at which the manufacturers sell such goods to conventional retail outlets, which makes such sales particularly attractive for duty free merchants. Typically, government regulations will govern the manner is which goods may be brought into and taken out of bonded facilities, and will include strict inventory and record keeping requirements to insure that duty free goods in the bonded facility do not find their way into local commerce.

To maintain duty free status, duty free merchandise may only be delivered to travelers departing the country from which the goods are sold for use and/or consumption outside that country, though such goods may be reimported without duty or tax, provided their value does not exceed the entry exemption allowed for imported goods. To insure that duty free merchandise is exported, most countries have regulations governing where duty free shops may be located and where duty free merchandise may be delivered to the traveler. Although a duty or tax may be due to the destination country upon arrival, many countries exempt a predetermined monetary value of imported goods intended for personal use, i.e., not intended for resale. Consequently, if the traveler purchases duty free goods for personal use under the limit set by the destination country, no duty or tax will be payable either to the country where the goods were purchased or to the destination country. And even if the purchases exceed the exemption allowed by the destination country, a duty and/or tax is only due on the overage.

In the United States, jurisdiction over duty free sales is relegated to the Treasury Department and implemented by the United States Customs Service, which, in turn, has authority to relegate certain responsibilities to port directors at airports and seaports. The current regulations governing duty free facilities and delivery of duty free merchandise to international travelers is found in Title 19 of the Code of Federal Regulations, §§19.35 et seq. These regulations provide, among other things, that "conditionally duty-free merchandise" (defined as merchandise sold by a duty free store on which duties and/or internal revenue taxes, if any are applicable, have not been paid) for export at airport, seaport or land exit points may only be sold and delivered to persons displaying tickets or other proof of imminent departure from the country. To insure that duty free merchandise in fact leaves the country, the regulations also include strict limitations on where duty free merchandise may be delivered to international travelers, with such delivery generally limited to at or beyond the "exit point", which is defined in the regulations as an area in close proximity to an actual exit for departing the country. In the case of an airport the regulations provide that the exit point may be a gate holding area if the gate holding area is sufficiently secure that there is a reasonable assurance that conditionally duty-free merchandise delivered there will be exported from the country. In the case of a seaport or land border, the exit point is defined in the regulations as the point at which a departing individual has no practical alternative but to continue on to a foreign country or to return to the country of departure by returning through a U.S. Customs inspection facility. The regulations also provide that conditionally duty-free merchandise brought back into the country is subject to U.S. duty and tax, subject, however, to the personal exemption afforded international travelers arriving in the United States, which is currently $400.00 per person, though this exemption can be pooled among multiple travelers for more expensive goods and in some cases, such as goods imported from the U.S. Virgin Islands, the exemption is higher. Most other countries have restrictions on duty free sales similar to those enacted in the United States.

It will be apparent, therefore, that new and creative methods of generating duty free sales are limited by the restrictive government regulations governing such sales, and also by the above-discussed limitations inherent in the current methods for effecting such sales.

SUMMARY OF THE INVENTION

The present invention is directed to a novel method and apparatus for effecting sales of consumer items by combining the sale of such items with the sale of travel tickets in a way that provides travelers with incentives to purchase the consumer items, the travel tickets, or both. As used herein, the terms "consumer items", "goods" and "merchandise" are used interchangeably and mean consumer goods of all types including but not limited to jewelry, electronics, clothing, liquor, cigarettes and most particularly high-end consumer products currently sold as duty free merchandise, as well as consumer services, e.g. mobile phone service, internet access service, etc. The inventive method and apparatus recognize and capitalize on certain realities particularly applicable in the international travel business and, in one preferred embodiment, achieves highly effective implementation by employing the internet or other computer network as a medium for effecting transactions.

The present invention provides additional incentive for travelers to purchase consumer items and/or travel tickets, motivates carriers to accommodate the merchant selling consumer items and, depending on the merchant's selling prices, may result in increased profit margins to the merchant as compared with current methods of selling consumer items, and particularly duty free goods.

In accordance with one embodiment of the method of the present invention, international travelers are encouraged to purchase duty free goods by being offered free or discounted international travel fares and/or international travelers are encouraged to purchase international travel tickets by being offered free or discounted duty free goods. To carry out the method, a merchant purchases duty free goods at discounted prices, i.e., at wholesale, from a manufacturer, distributor, etc., and also purchases surplus travel tickets at a discounted price from an international passenger carrier such as an airline, cruise ship, etc. This allows the merchant to offer passengers free or discounted travel tickets upon purchase of a threshold dollar amount of duty free goods, with the duty free goods being offered by the merchant at a price below a current retail price for such goods. Alternatively, the merchant can offer passengers free or discounted duty free goods upon purchase of a threshold dollar amount of travel. Although the present invention is most preferably implemented in connection with the combined sale of duty free goods and international travel tickets, it will be apparent that the present invention may also be used to effect the combined sale of non-duty free goods with domestic and/or international travel tickets.

In the case of airlines, for example, the present invention exploits the fact that on many international routes the "load factor", i.e., the percentage of seats filled, is below 100%, and often well below 100%. Typically an airline knows well in advance of departure the expected percentage of seats it will be able to sell at published prices for a particular international route. Although there is, of course, some expense attributable to each additional passenger for meals, fuel, toiletries, etc., for the most part any extra revenue which the airline can derive from selling otherwise unfilled seats is pure profit. For this reason airlines are willing to sell unfilled seats at a deep discount from published prices. In accordance with the present invention, the merchant takes advantage of this reality by contracting with one or more airlines to purchase tickets for international travel at prices that are deeply discounted from the published prices. The exact form of this transaction will, of course, be negotiated between the merchant and each carrier, though it is presently contemplated that to obtain the best discounted price, the merchant will commit to buy an agreed upon number of seats on a number of different international routes. It is also contemplated that in return for the merchant's purchase commitment, the airline will afford the merchant the right to deliver duty free goods to the airline's point of international departure or point of international arrival (e.g., the boarding gate, holding area, etc.), or even during flight with the assistance of airline personnel.

In addition to acquiring tickets for international travel at discounted prices, the merchant will also contract to buy conditionally duty-free goods for sale to international travelers. Of course, the merchant will have to maintain a facility compliant with all applicable regulations for storing such merchandise, though such facility need not be at or near a terminal of departure (e.g., airport, train station, etc.) if it is solely a storage facility, i.e., is not a sales outlet. It will be appreciated that the price the merchant will have to pay to the manufacturer or distributor of the conditionally duty-free goods will be negotiated between the parties, but typically it will be a wholesale price well below the retail price at which such goods are routinely sold.

In accordance with one aspect of the present invention, the merchant will advertise the duty free goods together with the merchant's selling price therefor, with the price preferably set at or near, but preferably not above, the price at which the same or comparable duty free goods are being sold through conventional channels, such as airport terminal duty free shops, in-flight trolleys and catalogs. Competitor prices are, of course, widely published and, therefore, readily available to the merchant whereby the merchant can always be sure that its prices are competitive.

In addition to advertising duty free goods, the merchant will also advertise international travel on routes for which the merchant has contracted to purchase seats from the passenger carriers at discounted prices. Although not mandatory for practicing this embodiment of the invention, the merchant may also display prices for such international travel that preferably are at or below, but preferably not above, the lowest or most widely available price for such travel as published by the airlines.

The discounted price paid by the merchant for international travel tickets allows the merchant to sell duty free goods at competitive prices, while at the same time offering a free or deeply discounted ticket for international travel, with the merchant still making a reasonable profit on the transaction. The international traveler is therefore motivated to deal with the merchant because the traveler thereby not only obtains duty free goods at competitive prices, but also obtains a free or discounted ticket for international travel as part of the same transaction.

By way of example, suppose a merchant advertises a roundtrip between New York's JFK airport and London's Heathrow airport departing Mar. 29, 2000 at 9 P.M. and returning on Apr. 5, 2000 at 6 A.M. Suppose further that the airline's published price for the fare is $1300.00, and that the merchant has negotiated to purchase tickets for this roundtrip from the airline at $300.00. Suppose now that among the duty free goods advertised by the merchant is a Rado® watch which sells at retail in New York City for $1,200.00 and is advertised by conventional duty free outlets at $1,000, which means that the manufacturer's wholesale price to the merchant for the Rado® watch will be approximately $500.00 or less. If the traveler purchases the Rado® watch from the merchant for $1,000.00, the merchant can provide the roundtrip ticket for "free" and still realize a gross profit margin of $200.00, i.e., the $1,000.00 price to the traveler for the Rado® watch, less the merchant's cost to acquire the watch ($500.00), less the cost of the ticket ($300.00).

To practice this embodiment of the invention, the merchant need not display the price for the travel ticket, but rather need only advise the purchaser of the dollar value of duty free merchandise which must be purchased to qualify for a free ticket on the various international travel routes advertised by the merchant. In the example above, the merchant could advertise that if the traveler purchases duty free goods valued at $1,000.00, then the traveler would qualify for a free round trip ticket between London's Heathrow airport and New York's JFK airport at the dates and times specified. Alternatively, the consumer could first select a particular travel ticket, and the merchant could then prompt the consumer with the amount of duty free goods which must be purchased to receive the selected ticket for "free". As a yet further alternative, the consumer could first select consumer items for purchase, whereupon the merchant could then prompt the user as to which free travel tickets are available to the consumer based on the dollar volume of the consumer's duty free purchases.

Of course, the merchant might have numerous routes for which the customer would qualify by purchasing $1000.00 of duty free goods, any one of which could be selected once the traveler purchases the required dollar amount of duty free goods. Similarly, depending on the prices paid by the merchant to the airlines for the various international travel routes available from the merchant, the merchant could set different minimum duty free purchase requirements to qualify for different international travel routes. For example, if the merchant acquired international travel tickets between London's Heathrow airport and Los Angeles' LAX for $500.00, the merchant could advertise to travelers that they must purchase $1,300.00 of duty free goods to qualify for a free ticket on that route, thereby maintaining the merchant's gross profit margin of $200.00, i.e., $1,300.00 paid by the traveler for duty free goods, less $600.00 representing the merchant's cost for the goods, less $500.00 representing the merchant's cost for the ticket. Of course, the merchant could also periodically modify these requirements. For example, if the travel date were nearing and the merchant had a number of unsold tickets on a particular route, the merchant could reduce the minimum duty free purchase requirement to qualify for a free ticket on that route, thereby reducing the merchant's gross profit margin for the transaction, but also reducing the risk of unsold tickets.

The economics of selling duty free merchandise in accordance with the present invention are highlighted by comparing the foregoing hypothetical sale with a sale of duty free merchandise made through a conventional duty free outlet. For example, suppose a traveler purchased the same Rado® watch at a duty free shop situated in an authorized duty free zone at an international airport. The watch would still be sold for $1,000.00 and the cost to the merchant would still be $500.00. However, the merchant would have to pay a concession fee to the airport that, for purposes of this example, is assumed to be 32%, which is realistic based on current practice. So, the merchant would pay a concession fee of $320.00, bringing his gross profit margin down to $180.00, i.e., the $1,000.00 selling price for the Rado® watch, less the merchant's cost to acquire the watch ($500.00), less the concession fee ($320.00). Moreover, all the traveler will have acquired is the watch. On the other hand, in accordance with the present invention, for the same price the traveler will acquire the watch and a travel ticket. And by utilizing the present invention the merchant will make the same or a slightly higher profit on the transaction, even before taking into account the additional costs of maintaining a conventional duty free sales facility which are avoided by a merchant employing the present invention, for which only a storage facility is required for maintaining inventory. A further advantage of this embodiment of the present invention is that the merchant need not concern itself with the airline's published price for the routes advertised by the merchant, which may change as the departure date nears. Indeed, and as noted, the merchant need not even post the fares, but rather need only advise the traveler of the dollar value of duty free merchandise which the traveler must purchase to qualify for each advertised route.

Returning to the example of a Rado® watch sold in accordance with the present invention, once the traveler selects a mode of payment and completes the transaction, the merchant forwards the international travel ticket to the traveler in any available way, as by using the services of a travel agent, or arranging for the airline to deliver the ticket, depending on the arrangement negotiated with the airline, or alternatively by issuing an e-ticket. As for delivering the duty free merchandise to the traveler, that must still be done in accordance with the applicable government regulations, which typically require that the merchandise be delivered at or near the exit point, which for air travel is at or after the departure gate.

In accordance with one aspect of the invention, as part of the arrangement to purchase discounted tickets in bulk, the merchant will negotiate with the airline to allow delivery of the duty free merchandise to the traveler at a location permitted by applicable government regulations, which may be at the gate, on the plane, upon arrival in the destination country, or upon arrival on the return trip. Unlike conventional methods of selling duty free merchandise, which require a third party provider to pay an airport or airline for the privilege of selling duty free merchandise to international travelers, it is anticipated that no such payment will be due from a merchant selling duty free merchandise in accordance with the present invention, because the airline is satisfied to sell its unfilled seats, and in return is expected to cooperate with the merchant to effect delivery of the duty free merchandise at no additional charge to the merchant. But even if the airline does charge a fee to the merchant for assisting or allowing delivery of duty free merchandise at the gate area or on the plane, the fee will, presumably, be far less than the fees currently paid to airports and airlines by third party providers which sell duty free merchandise by conventional methods.

In a variation of the present invention, the merchant may decide to offer consumer items for free provided the traveler purchases a ticket of sufficient dollar value at the merchant's advertised price. In that event, it would, of course, be necessary for the merchant to advertise the available travel routes together with the merchant's ticket price, which preferably still would be at or below the airline's current retail ticket price. The merchant would also advertise the consumer items available for selection, but in this embodiment it would not be essential for the merchant to advertise prices for the merchandise, although preferably the merchant would still do so, or at least the merchant would advertise retail and/or its competitor's prices for the merchandise. In either event, an international traveler, for example, would select an international travel route for purchase at the merchant's advertised price. The traveler would also be entitled to select duty free merchandise, with the dollar value of the duty free merchandise selectable by the traveler being dependent on the dollar value of the traveler's ticket purchase. If no prices are shown for the merchandise, then for each purchase of one or more tickets the traveler would be shown pictures or descriptions of available duty free merchandise from which a selection can be made. If, as is preferred, the merchant's selling prices for the merchandise were shown, then the traveler would be advised of the dollar amount of duty free merchandise which could be acquired for free based on the price of the ticket(s) purchased by the traveler.

Using again the example given above, the traveler would see the merchant's advertised price for a round trip to London, which preferably would be at or below the airline's published price of $1,300.00 for that route. The traveler would also be advised that upon purchase of that ticket the traveler would receive, at no additional charge, duty free merchandise up to a value of $1,000.00, which in the example under consideration would include the Rado® watch. Assuming the merchant's advertised price for the round trip ticket to London were the same as the airline's published price of $1,300.00, if the traveler then bought the ticket and selected the Radon watch, the merchant would secure a gross profit margin of $500.00, i.e., the purchase price of the ticket to the traveler $1,300.00, less the merchant's cost for acquiring the watch ($500.00), less the merchant's cost for acquiring the ticket ($300.00). It will be noted that in this embodiment of the invention the gross profit margin to the merchant ($500.00) is higher than in the earlier-described embodiment ($200.00), and this will vary from one transaction to the next dependent upon the differential between the airline's published price for the travel ticket and the discounted ticket price paid by the merchant. By opting to use this second embodiment of the invention, i.e., sell the ticket and offer "free" duty free merchandise, the merchant has the additional option of offering the airline ticket to the traveler at a discount to the published price while still securing a reasonable gross profit margin. In the example given, the merchant could instead offer the round trip ticket to London for $1,000.00 and still secure a gross profit margin of $200.00, i.e., $1,000.00 received for the ticket, less the cost of the watch ($500.00), less the cost of the ticket ($300.00). In either event, the transaction would then proceed in the manner described above for the embodiment wherein the traveler purchases duty free merchandise and acquires a "free" or discounted ticket.

When this second embodiment is selected, the merchant will also have the option of adjusting the advertised ticket price should the airline's published price vary. For example, if the airline raises its published ticket price as the departure date nears, the merchant would have the option of raising the merchant's advertised ticket price, thereby increasing the merchant's profit margin while maintaining a competitive ticket price.

Regardless of which embodiment of the present invention is employed, it will be appreciated that numerous variations and modifications may be adopted. For example, taking the first embodiment of offering free or discounted tickets upon the purchase of a threshold dollar amount of duty free merchandise, if the duty free merchandise purchased by the traveler is insufficient to qualify for a free ticket for the route selected by the traveler, the traveler could be advised that he could still acquire the ticket by paying a surcharge, which may still be far less than the airline's published price for the ticket. For example, if the traveler opted to purchase duty free merchandise valued at only $800.00, and wanted to acquire the round trip ticket to London, the ticket probably would not be provided for free, as the merchant then would have a gross profit margin of only $100.00, i.e., the sale price of the merchandise ($800.00), less the cost to acquire the merchandise ($400.00), less the cost to acquire the ticket ($300.00). However, the merchant could offer the traveler the option of completing the transaction by paying a surcharge of $100.00, which would give the merchant a gross profit margin of $200.00 while still providing the ticket to the traveler for only $100.00, i.e., well below the airline's advertised price. Of course, the traveler could also simply increase his duty free purchase to qualify for a free ticket, which he may do by "pooling" his duty free purchases with purchases for other international travelers.

Similarly, if the second embodiment of the invention is employed (i.e. buying a ticket and receiving free merchandise), the traveler could be offered the option of paying a surcharge if the ticket he purchases does not qualify for the merchandise he wants. For example, if the traveler purchases a ticket for $800.00, but wants the Rado® watch, the traveler would not qualify for the watch because it would leave the merchant with an inadequate profit margin, i.e., the selling price of the ticket ($800.00), less the cost of the ticket (about $250.00), less the cost of the watch ($500.00), would leave the merchant with a gross profit margin of only $50.00. But the merchant could offer the traveler the option of completing the transaction by paying a surcharge of $150.00, which would then give the merchant a gross profit margin of $200.00, while still allowing the traveler to acquire the watch at only $150.00, i.e., well below the best available duty free price. Or the merchant could require the traveler to pay a higher surcharge, thereby increasing the merchant's gross profit margin.

As a further alternative, instead of offering "free" duty free merchandise upon purchase of a ticket or a "free" ticket upon purchase of duty free merchandise, the merchant could advertise selling prices for both tickets and merchandise, in which event, for example, the traveler could purchase a predetermined dollar amount of duty free merchandise dependent upon the dollar amount of the ticket purchased by the traveler, or vice versa, with the merchant setting the parameters in a way that maintains adequate profit margins.

Other objects and features of the present invention will become apparent from the following detailed description of certain preferred embodiments of the invention considered in conjunction with the accompanying drawings. It is to be understood, however, that the description of the preferred embodiments and the drawings are designed solely for purposes of illustration and not as a definition of the limits of the invention, for which reference should be made to the appended claims. It should be further understood that the drawings are not drawn to scale and, unless otherwise indicated, are intended to conceptually illustrate the structures and procedures described herein.

BRIEF DESCRIPTION OF THE DRAWINGS

In the drawings:

FIG. 3 is a representation of a merchandise inventory interface screen of a type that would be downloaded from the merchant server to the customer computer in the system of FIG. 1;

FIG. 4 is a representation of a flight schedule interface screen of a type that would be downloaded from the merchant server to the customer computer in the system of FIG. 1;

FIG. 5 is a representation of a customer purchase order interface screen of a type that would be downloaded from the merchant server to the customer computer in the system of FIG. 1;

FIG. 6 is a representation of a customer database screen of a type that would be accessible on the merchant server in the system of FIG. 1.

DETAILED DESCRIPTION OF THE PRESENTLY PREFERRED EMBODIMENTS

Figure 1:
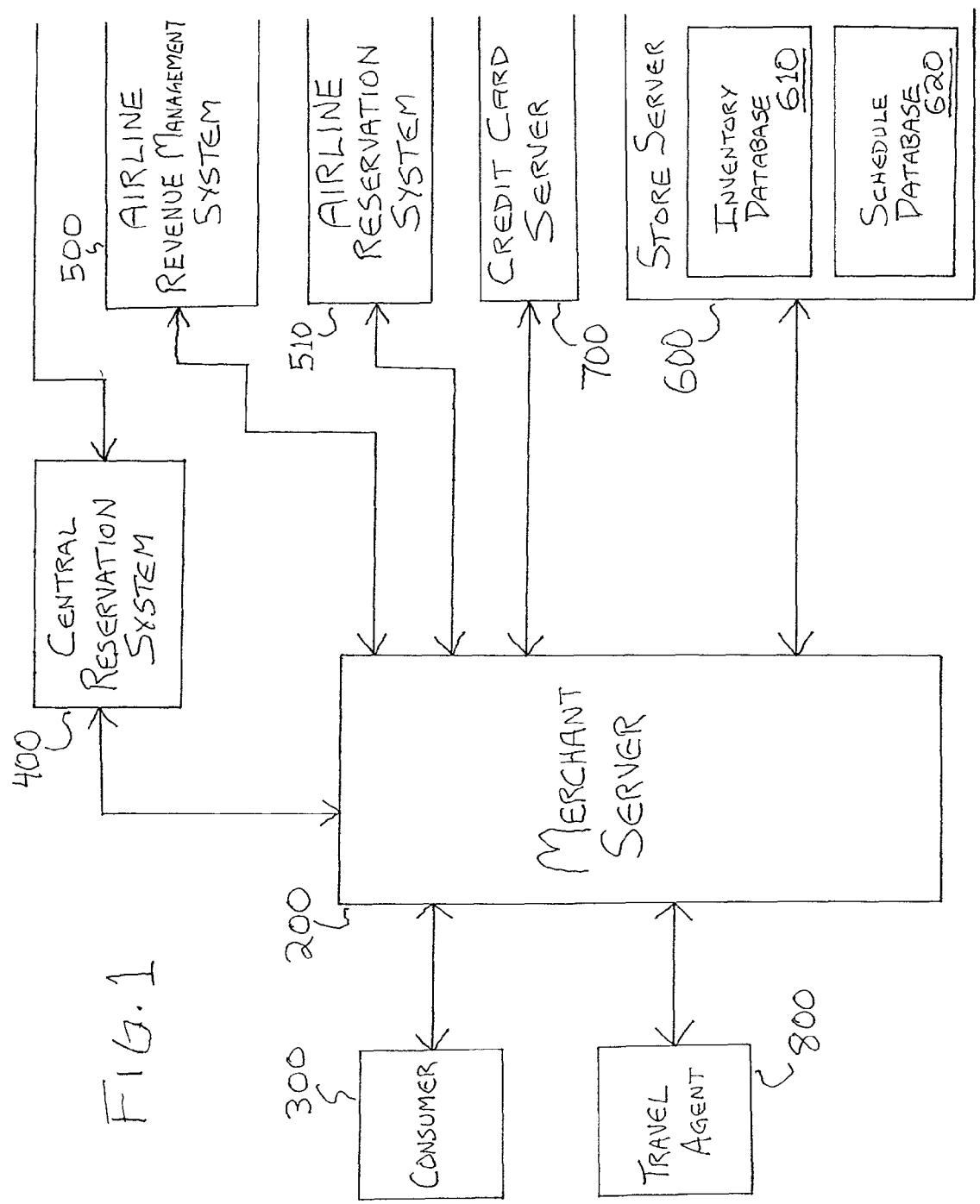
FIG. 1 is a block diagram depicting a preferred implementation of the present invention using currently available computer equipment communicating via the internet.

With reference to FIG. 1, the present invention is most preferably implemented by a system in which computers or the like communicate via a computer network, such as the internet. Such an implementation of the invention may be in the form of the preferred system 100 illustrated in block diagram form in FIG. 1. The system 100 will be described in conjunction with the preferred embodiment wherein the merchant is offering free or discounted international airline travel tickets to consumers who purchase a threshold dollar amount of duty free merchandise, though persons reading this description will understand that the system may also be used to implement the various other embodiments contemplated herein, such as offering free or discounted duty free merchandise to consumers who purchase a threshold dollar amount of international airline travel tickets, substituting or including cruise line tickets and/or domestic air travel tickets, offering goods and services that do not qualify as duty free, etc. Furthermore, while the system 100 represents a preferred implementation of the present invention, its use to practice the method of the invention is not mandatory, and the method may be practiced in any number of alternate ways, including ways that do not utilize computers or the like and/or do not use a computer network as a medium of communication. Accordingly, the description of the preferred embodiments and the variations thereof suggested herein should not be construed as limiting the scope of the invention, which is defined in the appended claims.

As shown, system 100 includes a merchant server 200 which may be a general purpose digital computer operating software capable of uploading digital images and text, such as pictures and descriptions of consumer items and available travel tickets. The merchant server 200 is preferably capable of communicating with other personal computers or the like, of operating security software of a type well known in the art for providing secure on-line purchasing by protecting credit card numbers and other consumer information, and of performing various inventory and accounting functions, as by employing commercially available software, such as Microsoft Excel. The selection of a personal computer suitable for use as the merchant server 200 is well within the capabilities of the person of ordinary skill in the art.

Figure 2:
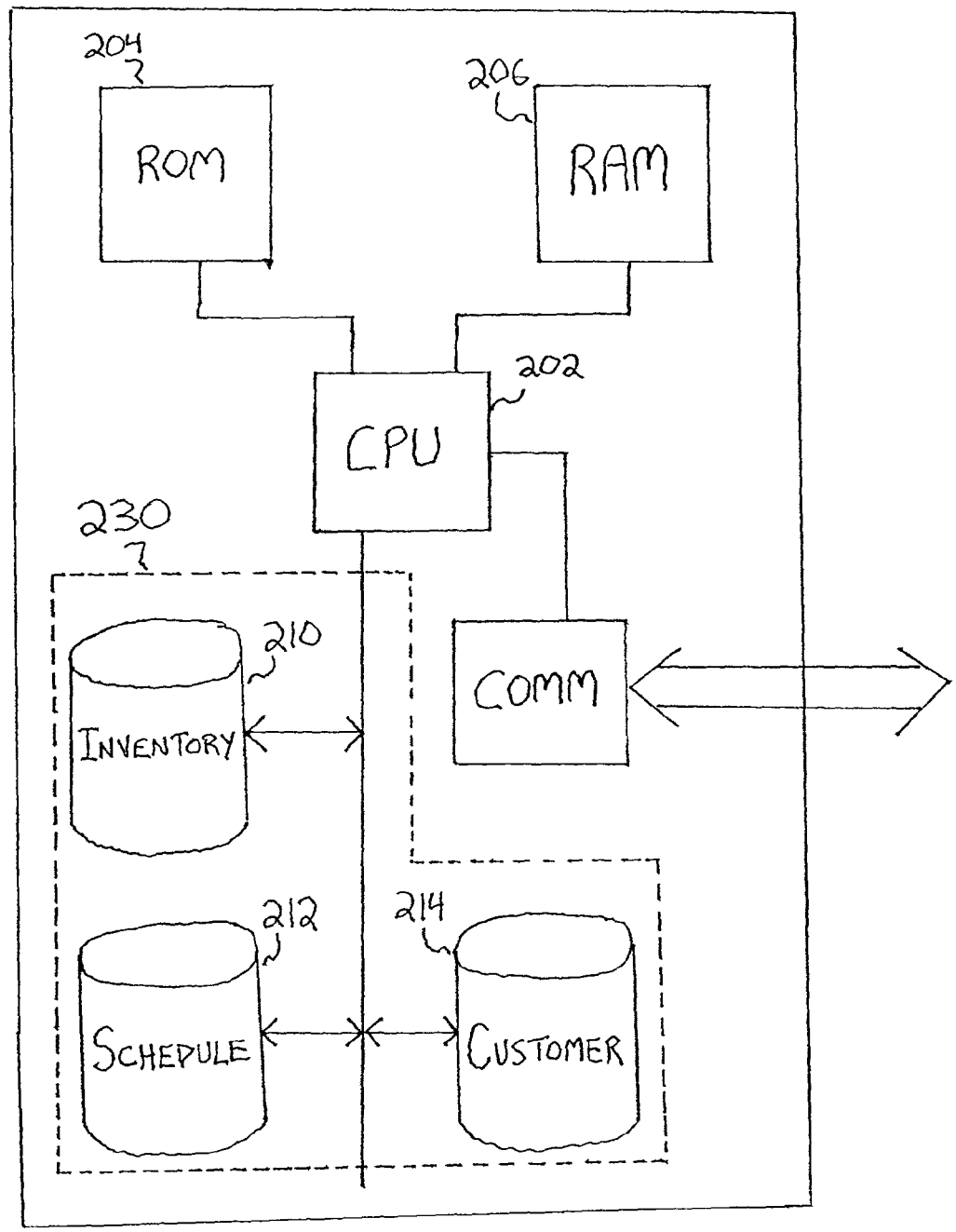
FIG. 2 is a block diagram depicting in greater detail the merchant server in FIG. 1.
Figure 7A:
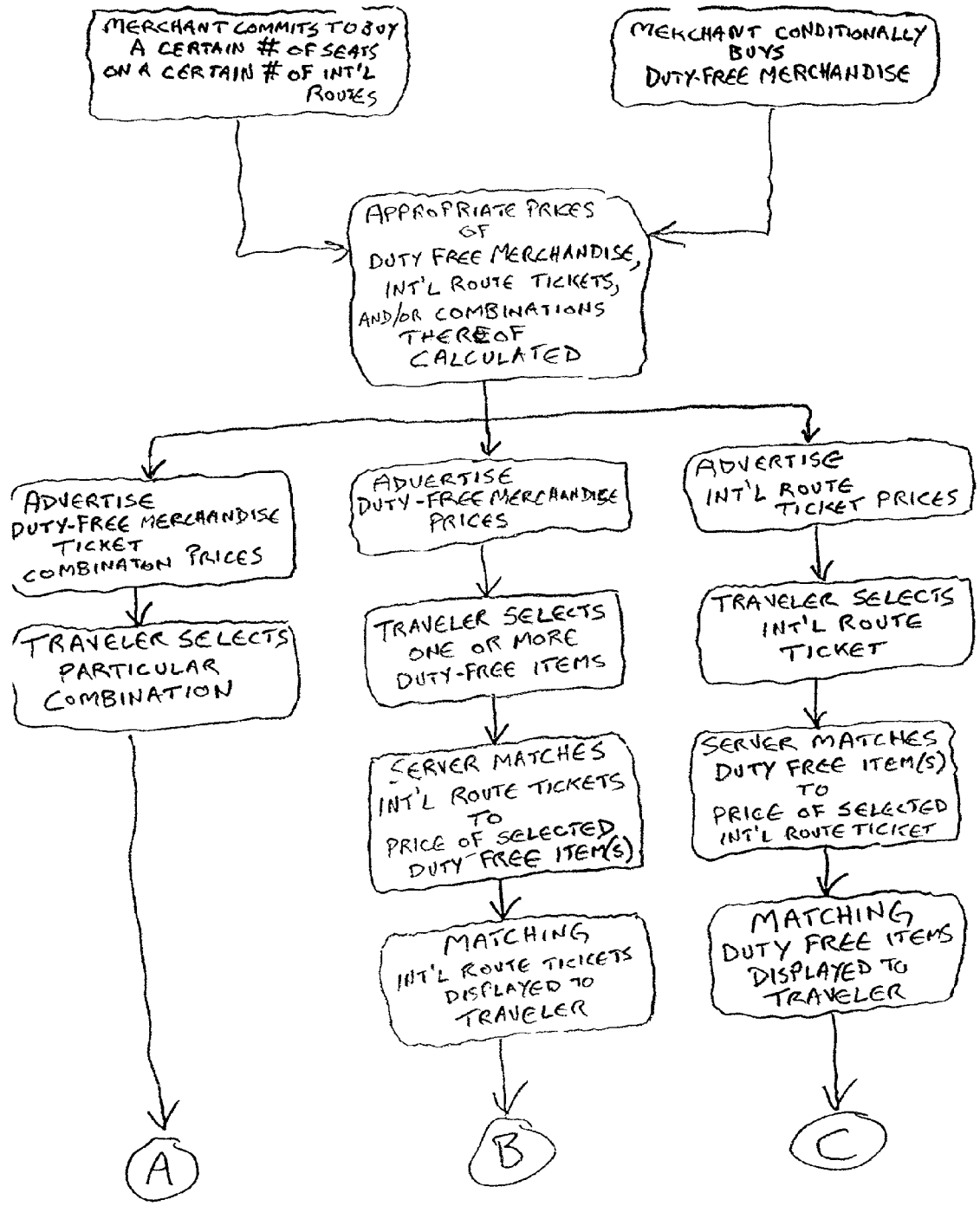
FIGS. 7A-7D comprise a flow chart illustrating certain preferred implementations of the present invention.
Figure 7B:
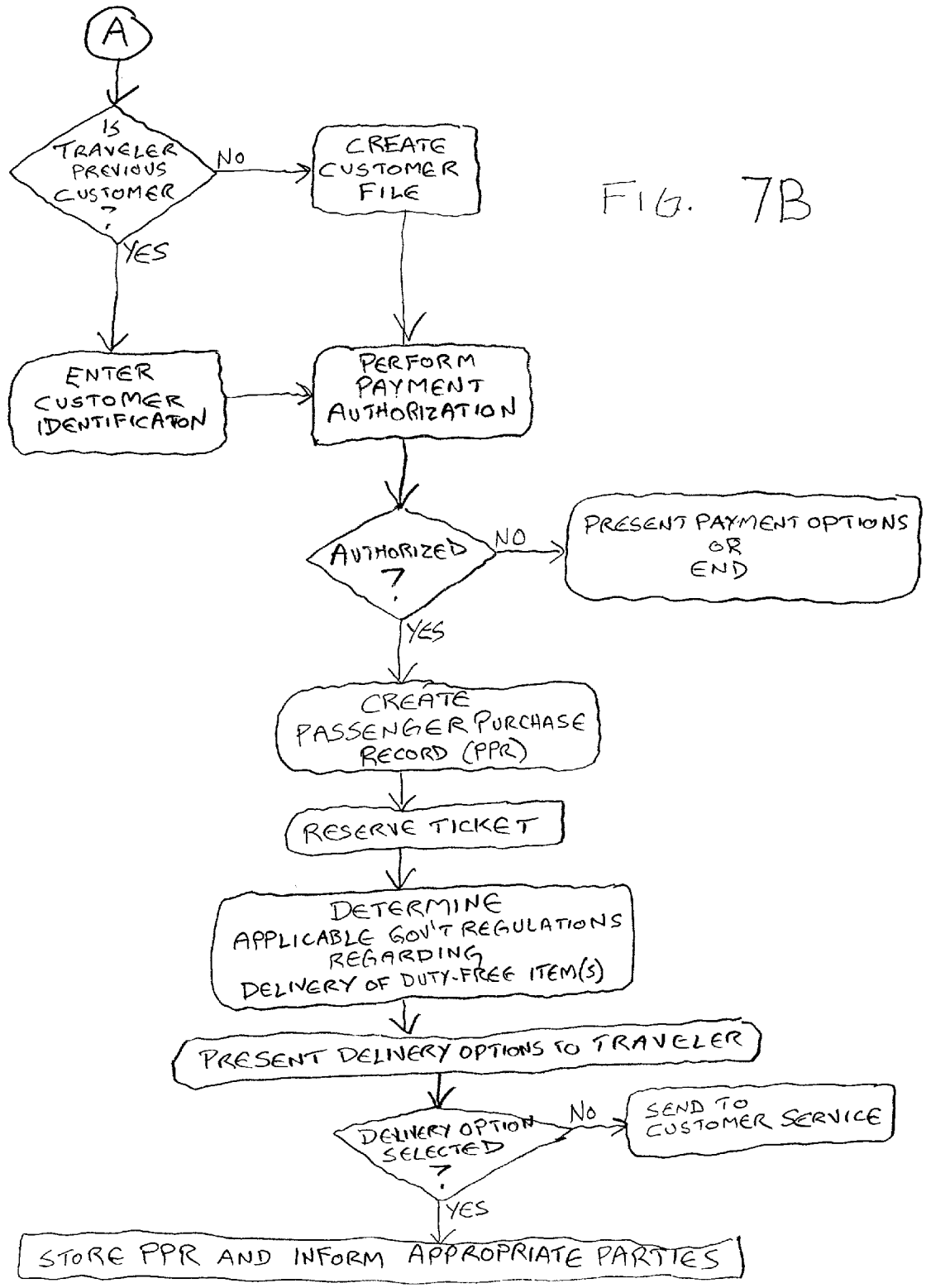
Figure 7C:
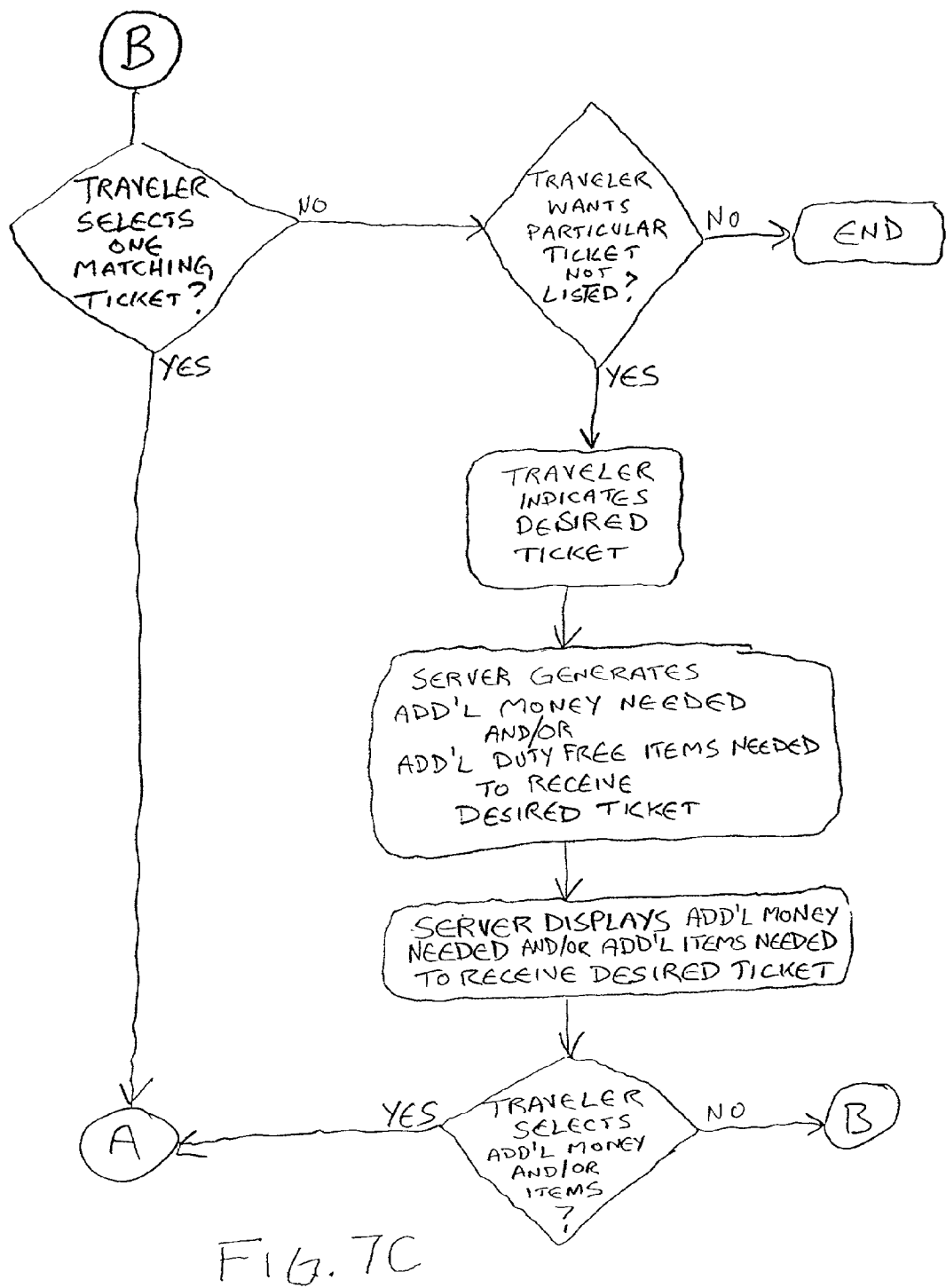
Figure 7D:
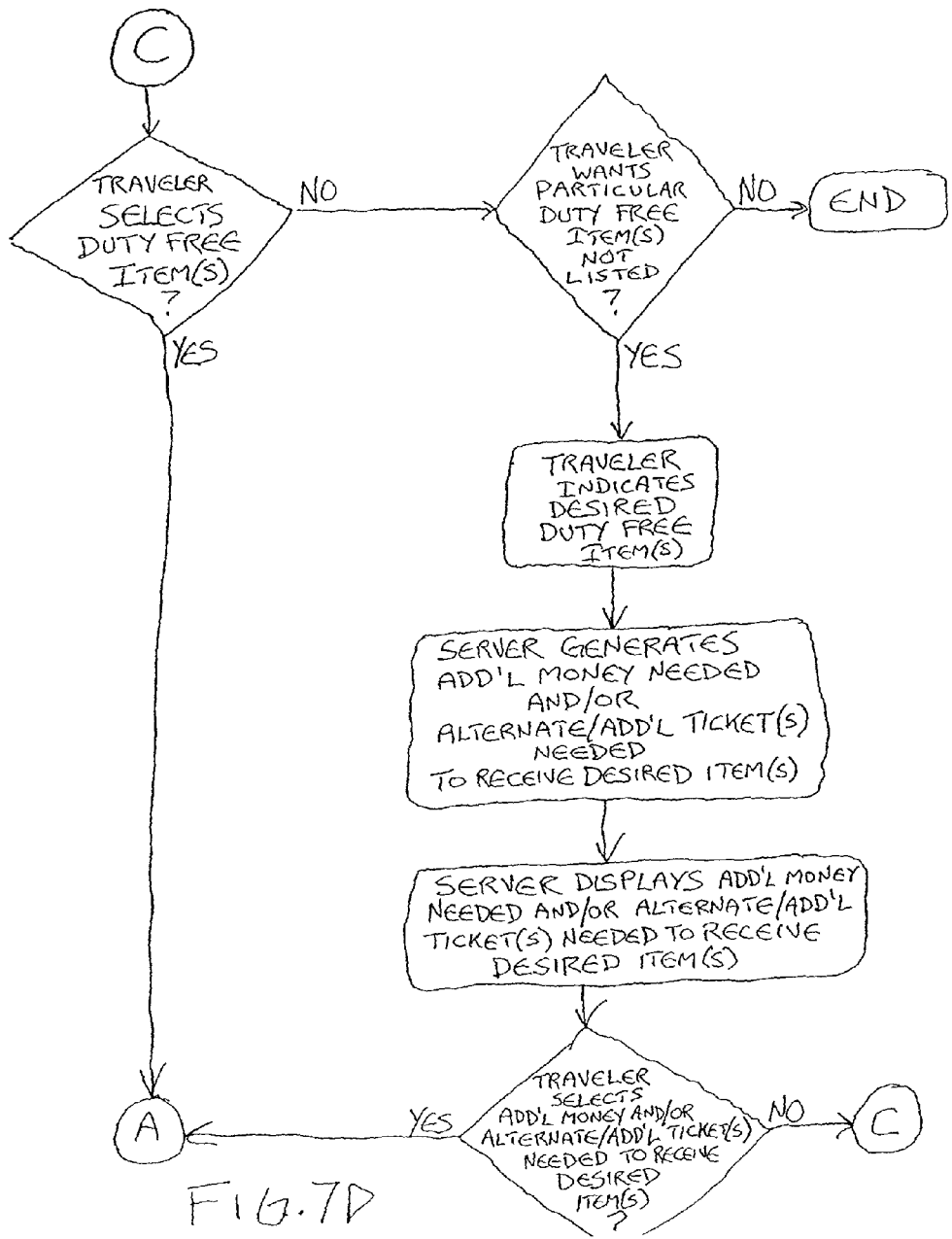

As best seen in FIG. 2 wherein the merchant server is illustrated in block diagram form, the merchant server 200 includes a central processing unit 202, ROM 204 and RAM 206, the functions of which are well known to those skilled in the art. In addition, merchant server 200 includes communication hardware and software 208 which is preferably capable of simultaneously communicating with multiple remote computers or the like using, for example, a computer network such as the internet as a communication medium. While the communication hardware and software 208 is preferably incorporated in the server 200, it may be a separate unit connected to server 200. The merchant server 200 also includes or is in communication with a consumer items inventory database 210, a flight schedule database 212 and a customer database 214. These databases are preferably incorporated in the main storage drive of the merchant server 200, e.g., its hard drive 230, though they may be located proximate the merchant server 200 or remote therefrom and connected thereto by, for example, a modem, a dedicated connection line, etc. The consumer items inventory database 210 preferably includes images, descriptions and prices of the consumer items being offered by the merchant, and also preferably includes information only accessible by the merchant, such as the price at which the merchandise was acquired, the number of units in current inventory, etc. Of course, all of the databases 210, 212 and 214 can be updated by the merchant as frequently as necessary. The flight schedule database 212 preferably includes information concerning the flights currently available from the merchant, such as destination, departure airport, arrival airport, date and time of departure, date and time of arrival, any stopovers, class of travel, restrictions, etc. The flight schedule database 212 will also preferably include information only accessible by the merchant, such as the price at which the merchant has contracted to purchase the ticket, the number of tickets available, etc. As explained more fully below, some of the fields in the flight schedule database 212 may be updated automatically with information provided by other computers communicating with merchant server 200 via communication hardware and software 208. The customer database 214 preferably includes information concerning customers who have used the system, such as name, address, credit card number, passport number, order history, etc. This information is preferably accessible only by the merchant, or, upon entry of a password or other security code, an individual customer preferably may access, but not modify, his or her own information, for example to check the status of a pending order or to place a new order.

Also preferably stored in the merchant server is application software for carrying out the various functions required to implement the present invention, i.e., communicating with external communication devices, accessing information from the various databases, calculating pricing for consumer items and or tickets, etc. Persons skilled in the art who have read this description will be fully capable of writing application software suitable for implementing the present invention on the merchant server 200.

The consumer items in the inventory database 210 are purchased by the merchant from the typical sources for such items, e.g., manufacturers, distributors, etc. The merchant may purchase such items in any appropriate way, as by contacting a merchandise source via a computer network by, for example, accessing a business-to-business web site of a manufacturer, though any other suitable mechanism may also be employed, such as ordering by telephone or mail. In the case of duty free goods, the goods are preferably shipped to a location specified by the merchant which is dedicated to duty free goods, e.g., a bonded warehouse or storage facility. As noted above, such a facility can be obtained and operated at a cost significantly less than the cost of obtaining and operating a duty free goods retail establishment, such as those found at airports.

Surplus travel tickets are preferably purchased by the merchant from passenger carriers, and such purchases may be carried out by using a computer network such as the internet, ordering by phone, etc. Of course, it is not necessary that the merchant actually purchase the tickets in advance of offering them for sale on the merchant computer 200, and it is contemplated, for example, that the merchant may instead contract with the airlines to purchase a minimum dollar amount of travel tickets on a number of different routes, with actual purchases awaiting customer selection. In either case, the tickets preferably are purchased or reserved for purchase by the merchant at prices below the rates at which such tickets are sold at retail to consumers. It is contemplated that once the invention is implemented, carriers will choose to alert the merchant of the availability of surplus tickets in the expectation of purchase by the merchant for resale or transfer to the merchant's customers.

Referring again to FIG. 1, the consumer preferably accesses the merchant server 200 by using a consumer personal computer 300, though such access may also be effected by any other known means which provides wireless or wired communication with the merchant server 200, such as a PDA, a mobile phone with wireless internet accessibility, etc. The consumer personal computer 300 may also comprise a designated purpose computer or communication device in a kiosk, which may be operated by or under the authority of the merchant. In any event, and as presently preferred, the consumer's personal computer 300 communicates with the merchant server 200 via the internet using, for example, modems for analog lines or routers for digital lines.

It is contemplated that once the consumer accesses the merchant server 200, the consumer will first see on his personal computer 300 or other device the merchant's "home page" screen, which will prompt the user to select among various options, such as checking the status of a previous order, viewing consumer items available for sale, viewing available travel tickets, etc. In a typical scenario, a consumer who wants to place an order will select the prompt for viewing consumer items available for sale. In that event, the merchant server 200 may next communicate to the consumer's personal computer 300 an inventory database interface screen of the type depicted at 220 in FIG. 3 which presents for viewing by the consumer selected fields from the inventory database 210, such as item number, description, weight, the merchant's selling price, the local retail price, any restrictions, and an image of the item. Because the merchant will typically have a large number of items for sale, not all of which will fit on a single screen, the consumer can preferably scroll through the available items in a manner well known to those skilled in the art. As a further alternative, instead of immediately displaying consumer items available for sale as on screen 220, the first screen may present the consumer with the ability to choose a specific category of merchandise, such as watches, jewelry, clothing, etc., such that only items in the selected category are displayed to the consumer. As a yet further alternative, the merchant server 200 may include a searchable database of consumer items, such that the consumer may select items for viewing based on product category, price, or any other attribute, all in a manner readily implemented by those skilled in the art. Regardless of which approach is used, once the consumer accesses a screen displaying consumer items for sale, the screen preferably includes information on how to select an item for purchase, as by entering the item number, highlighting the item and clicking "enter", using a touch screen if available, for example at a kiosk, etc., and all such methods and others well known to persons skilled in the art may be used. Preferably, the application software in merchant server 200 will allow the consumer to select multiple items, and preferably the consumer may at any time access a separate screen, not shown, which will apprise her of the items that have been selected for the current purchase, including a price subtotal, weight subtotal, etc. This can be effected, for example, by providing a prompt on each screen which, when selected, presents a screen on the consumer computer 300 showing the particulars of the current order.

Once the consumer completes the selection of consumer items for purchase, the consumer will so indicate, as by responding affirmatively to a prompt on the consumer's computer 300. The consumer may then be prompted to scan the flight schedule database 212, whereupon the consumer may be presented with a flight schedule interface screen such as the screen 225 depicted in FIG. 4, which may be scrollable, and which presents to the consumer in table form information from selected fields in the database 212. It is contemplated that the consumer simultaneously may be advised, as in a separate box on the screen, of the total dollar value of duty free purchases the consumer has selected, so that the consumer will know for each listed flight whether or not he has qualified for a free ticket and, if not, how much additional money he must spend to get the ticket. At this point the consumer may be prompted to select one or more travel tickets for acquisition, and the consumer may indicate his selections in any of the manners suggested above for selecting items for purchase from the consumer inventory interface screen 220. If the consumer selects a flight for which the consumer qualifies for a free ticket, the merchant server 200 may prompt the consumer to confirm his selection and, thereafter, to indicate whether the consumer has completed his flight selections. If the consumer has selected a flight that has an associated dollar value that is less than the dollar value for which the consumer has qualified based on the dollar value of the consumer items purchased by the consumer, the consumer may then be returned to the interface screen 225 so that additional flight selections may be made. Alternatively, the consumer may be offered the option of "reserving" any excess dollar value for future use, either alone or together with future purchases of consumer items, though the merchant may want to impose a time limit for using such excess dollars, in the absence of which they will be lost, i.e., erased from the customer's account. If the flight selected by the consumer has an associated dollar value which exceeds the dollar value for which the consumer has qualified based on the dollar value of the consumer's merchandise purchases, the consumer may be so advised by an appropriate message and prompted either to make another selection, purchase additional merchandise, or acquire the ticket by making up the difference with a cash payment, which may be less than the dollar value of merchandise which the consumer would have to buy, taking into account that the cash payment does not require the merchant to deliver any additional merchandise. It is also possible to offer the consumer the option of acquiring a ticket by making a purely cash payment, i.e., without purchasing any duty free merchandise, and in this event and for reasons just noted the merchant can set the price of the ticket lower than the dollar amount of merchandise the consumer would have had to buy to qualify for the same ticket.

All of the information in the flight schedule database 212 may be input by the merchant, though with reference to FIG. 1, preferably the merchant server 200 will be in constant or intermittent communication with a separate flight schedule database maintained by the airlines which contains the most current flight information such as flight numbers, updated departure times, cancellations, etc., and it is contemplated that database 212 will automatically be updated with such information. For example, with reference to FIG. 1, merchant server 200 may be in communication with a central reservation system 400 cooperatively administered by multiple airlines, or an airline reservation system 510 administered by a single airline, or both. In any event, of course, some information in the database 212 must be determined by the merchant, such as the dollar value of purchases required to acquire a free ticket.

While it has been suggested above that the consumer will first select, but not complete the purchase of duty free merchandise before selecting travel tickets, that is not necessary, and various alternative approaches may be employed, as long as the consumer is ultimately offered the option of acquiring free or discounted travel tickets upon purchase of duty free merchandise and/or offered free and/or discounted duty free merchandise upon purchase of a travel ticket. For example, the consumer may be required to complete the purchase of duty free merchandise before he is permitted to select a free travel ticket. Also, various strategies may be employed to facilitate the consumer's selection of tickets from the database 212. For example, based on the dollar amount of the duty free merchandise selected by the consumer for purchase, the consumer may be advised as to which travel tickets may be acquired for free, as by highlighting the available tickets on the screen 225 or by generating a new screen displaying only those tickets which the consumer may acquire for free. Alternatively, for those tickets for which the consumer would have to purchase additional merchandise and/or make a cash payment, screen 225 may be updated to include information as to the amount of additional merchandise and/or the cash payment required to qualify for each ticket.

In any event, once the consumer selects tickets from database 212 for acquisition, the merchant server will advise the consumer via the consumer's computer 300 as to whether the selected purchases qualify the consumer to receive the selected ticket for free and, if not, may offer the consumer the option of acquiring the ticket by making a cash payment and/or returning to screen 220 to purchased additional merchandise. Even if the purchaser qualifies to receive the selected tickets for free, it is preferred that the consumer is offered the option of returning to the screen 220 to purchase additional goods. Of course, the consumer will also have the option at this point of indicating that the order has been completed. Once the consumer does indicate that his order is complete, the consumer may be asked for additional information, such as the type of ticket the consumer wants, e.g. paper ticket, e-ticket, a mailing address if a paper ticket is requested, the place of delivery of the duty free merchandise, e.g. on the plane, at the departure gate, etc., an email address, passport number, phone number, etc. Once this information is collected, the consumer may then be shown a screen, such as the screen 240 in FIG. 5, which displays all the details concerning the customer's order, including a description of the merchandise purchased, the dollar value of the merchandise purchased, the total weight of the duty free items, any surcharge due the merchant if the selected items do not qualify for a free ticket, how the merchandise will be delivered, the tickets selected, the method of ticket delivery, etc. This screen may also contain a box referencing the terms and conditions of the transaction, i.e., the contract terms, with the consumer being required to accept the terms and conditions before the transaction is further processed, as is common for commercial transactions carried out via the internet. Screen 240 may also offer the consumer the option of accepting the order, canceling, returning to the home page, returning to the merchandise database, returning to the flight schedule database, deleting items directly from screen 240, etc. As a further alternative, once the consumer has made a qualifying purchase, i.e., one that entitles her to at least one international travel ticket, the consumer may be offered the option of purchasing additional consumer items at lower prices than are required when purchasing consumer items for acquiring an international travel ticket. In this regard, it will be apparent that for the consumer's initial purchase, the merchant's acquisition cost for the travel ticket must be recovered in the selling price for the consumer item. However, for subsequent purchases of consumer items, this is not necessary, so additional consumer items can be offered to the consumer at lower prices while ultimately yielding the same, or possibly even a greater gross margin to the merchant for such additional consumer items. The merchant is able to offer low prices for such additional consumer items in part because the merchant's overhead costs are much lower than those for conventional duty free retail shops, trolley operators, etc.

Once the consumer does confirm his order for the selected items and flights as shown on screen 240, the consumer is then prompted to pay for the transaction, with payment preferably being carried out by a secure credit card transaction using, for example, third party software of a type available form a number of different vendors. This is diagrammatically illustrated in FIG. 1 by the connection between the merchant server 200 and the credit card server 700, and it is contemplated that the merchant server 200 will communicate with the credit card server 700 to verify and charge the customer's credit card account while the customer remains on-line such that the customer may receive instant verification that her order has been accepted. If for some reason instant acceptance is not possible, for example if the server 700 is down, the consumer may be so advised and provided with an email or regular mail notification of acceptance or rejection of the order at a later time. If the consumer's credit card is rejected, the consumer is preferably offered the option of inputting information for a different credit card.

Once payment is accepted, the merchant server 200 communicates the flight reservation to the central reservation system 400 or the airline reservation system 510, depending on whether the airline operates its own reservation system or is part of a central system, such as SABRE. If the consumer has selected an e-ticket, that information is also conveyed, so that the airline knows to issue an e-ticket when the passenger arrives for departure. If a paper ticket is selected, it is contemplated that the merchant server will communicate with a travel agent via a travel agent server 800, with the travel agent then generating a paper ticket for mailing to the address provided by the consumer. Alternatively, the merchant may itself issue the ticket to the consumer. Of course, in addition to acting as a conduit for delivering paper tickets to consumers, travel agents may also utilize the system 100 to acquire tickets on behalf of their own customers.

In addition to making a flight reservation and arranging ticket delivery, upon acceptance of payment the merchant server 200 will also convey information concerning the duty free merchandise purchased by the customer to the store server 600, which may be located at a bonded warehouse facility. In response, the server 600 will update its inventory database 610 by reserving the selected items against the customer's purchase order number or other identifier, thereby insuring that the store server always has current information concerning the quantity of each item available at the storage facility, so that new items can be ordered as necessary. Of course, this is a two-way communication, with the store server also continuously or intermittently updating the merchant server's inventory database 210 as new goods are received in the storage facility, etc. The merchant server also conveys to the store server's delivery schedule database 620 information concerning delivery of the ordered items so that personnel at the storage facility can make timely arrangements for delivery to the purchaser by, for example, delivering the merchandise to the purchaser at the departure gate or by delivering the merchandise to personnel at the airline if the merchandise is to be delivered in flight. Although depicted as separate units in FIG. 1, if the merchant server 200 is located at the storage facility for the duty free goods, the merchant server 200 and store server 600 may be combined as a single computer.

When payment is accepted, or earlier in the transaction process, the merchant server 200 may also generate a profile for the customer which is added to the customer database 214 in the merchant server 200 and which may take the form depicted in FIG. 6. The customer may access his own profile by using a password provided to the customer upon successful completion of his first transaction. The database provides valuable marketing information to the merchant, but also allows the customer to avoid having to reenter basic information, such as name, address, credit card number, etc., for each subsequent transaction. The customer database 214 may also include an order history, which provides useful marketing and planning information to the merchant and allows a customer to check prior orders. Once a transaction is completed, the merchant server 200 may generate a paper record for mailing or otherwise delivering to the customer, and such record may include, for example, a credit card receipt, confirmation of the items purchased, confirmation of the selected travel tickets, confirmation of terms and conditions of sale, etc.

The preferred embodiment of the invention has thus far been described primarily on the assumption that the customer will be offered free or discounted international travel tickets upon purchasing a predetermined dollar value of duty free merchandise. As previously noted, however, the present invention can equally be practiced by offering free or discounted duty free merchandise upon purchase of a predetermined dollar value of travel tickets. From the foregoing description persons skilled in the art will immediately understand how this variant of the invention can be practiced using the internet as a communication medium. In either case, the merchant server can be programmed to incorporate an algorithm which will set the predetermined purchase level which the customer must attain to obtain free or discounted consumer items and/or travel tickets. For example, after taking into account the merchant's acquisition costs for the consumer item(s) and travel ticket(s), the algorithm programmed in the merchant server can set the predetermined prices to the consumer to insure that the merchant achieves a gross margin of $200 or any other amount. If the consumer purchases do not qualify, the algorithm could then generate a message to the consumer advising her of the shortfall and offering the consumer the option of proceeding with the transaction by making a cash payment or by making additional or different purchases which reach the threshold for completing the transaction, or both. Of course the algorithm could set different thresholds for different tickets and/or merchandise, e.g., in accordance with customary practice the merchant may wish to achieve higher gross margins on more expensive consumer items and/or travel tickets. In setting the threshold purchase requirements, the algorithm may, of course, take into account any number of factors, such as prevailing market conditions, including changes in prevailing retail prices for the merchandise and or travel tickets. Indeed, a particular advantage of computer implementation of the invention is that it allows the merchant to adjust the parameters of acceptable transactions on a real time basis as often as is desired. For example, it is well known that airlines typically adjust ticket prices as the travel date approaches, with ticket prices typically increasing as the travel date nears. Airlines typically include a computer implemented revenue management system which calculates the number of seats to be released at each price and the date when the price will be adjusted to achieve the desired price distribution. As diagrammatically illustrated in FIG. 1, system 100 may include an airline revenue management system 500 in real time communication with merchant server 200 whereby merchant server 200 has access to current retail pricing for tickets offered by the merchant. Using an algorithm or other technique, the merchant may then adjust upwardly the amount of duty free merchandise which must be purchased to acquire that ticket thereby affording the merchant a higher gross margin while at the same time retaining a competitive pricing structure considering that the travel ticket has a higher intrinsic value based on the airline's higher retail price. In any case, persons skilled in the art are fully capable of generating the computer programs necessary to carry out the preferred embodiments of the present invention and the variants discussed herein.

Of course, and as noted, the preferred implementation using computers and the like communicating via wired or wireless transmission, e.g. over the internet, can also be employed to sell consumer items other than duty free merchandise and to sell travel tickets other than international airline travel, e.g., domestic air travel, train tickets, bus tickets, cruise line tickets, etc., the viability of such alternatives generally being dependent on the ability to acquire travel tickets from the respective carrier at discounted prices. For example, the method and system of the present invention are also applicable to Europe's "travel retail" industry. In Europe's travel retail industry, the merchant pays the duty on the merchandise but offers the merchandise to international travelers at a discounted price as compared with the price at which such merchandise is available at conventional retail shops. This is possible because under the European system the merchant acquires its merchandise from the manufacturer or distributor at a better price than the merchandise is offered to conventional retail shops.

While implementation using computers and the like is preferred, the present invention may also be practiced using less advanced technology. For example, the merchant's offerings of consumer items and travel tickets may be presented to consumers via catalogs, mailers, phone solicitations, email, etc., and orders taken via phone, mail, in person, etc. Of course, the merchant may also want to use conventional print, radio, television or advertisements on third party web sites to promote the merchant's business. Also, while the preferred embodiment contemplates payment by credit card, any suitable form of payment may be employed, such as debit card, electronic cash, check, etc. Payment could also be in the form of mileage points, whereby a traveler's accumulated mileage points could be cashed in to purchase ticket(s), which would then allow the traveler to acquire a predetermined dollar amount of free or discounted consumer items. Alternatively, the points could be cashed in to acquire consumer items, which would then allow the traveler to acquire a free or discounted travel ticket. If mileage points are accepted as payment, the merchant would, of course, have to advertise the number of points required to purchase tickets and/or consumer items, depending on which embodiment of the invention the merchant employs. Accordingly, as used herein, the term "price" refers to any form of consideration to be paid to acquire either travel tickets or consumer items. Furthermore, while it is presently contemplated and preferred that the present invention will be implemented by an independent merchant, it will be apparent that the present invention also could be directly implemented by a passenger carrier, such as an airline or cruise line, in which event, of course, the carrier will not have to pay, at least in the conventional sense of that word, to acquire travel tickets available from that carrier. Similarly, if the invention were implemented by a manufacturer of consumer items, the manufacturer would not have to pay to acquire the consumer items available from that manufacturer.

Furthermore, while only one consumer computer 300, one central reservation system 400, one airline management system 500, one airline reservation system 510, one store server 600, one credit card server 700 and one travel agent server 800 are shown, it is contemplated and preferred that merchant server 200 will be capable of communicating with a plurality of such computers at any given time, limited only by the technological limitations of the merchant server 200, e.g., the number of communication ports available. Similarly, merchant server 200 may comprise multiple merchant servers operating independently or in tandem.

Although the preferred embodiments of the invention already have been described in sufficient detail to enable those skilled in the art to practice the invention, a flow chart of the preferred method for practicing the invention is shown in FIG. 7. As will be apparent, the flow chart is tailored to the preferred embodiment wherein the customer is offered free or discounted travel tickets upon purchase of a predetermined dollar volume of duty free merchandise, and the manner in which the flow chart must be modified for the various other embodiments of the invention described herein will be readily apparent to those skilled in the art.

Thus, while there have been shown and described and pointed out fundamental novel features of the invention as applied to preferred embodiments thereof, it will be understood that various omissions and substitutions and changes in the form and details of the methods and systems described herein, and in their operation, may be made by those skilled in the art without departing from the spirit of the invention. For example, it is expressly intended that all combinations of those elements and/or method steps which perform substantially the same function in substantially the same way to achieve substantially the same result are within the scope of the invention. Moreover, excepting as expressly excluded herein, it should be recognized that structures and/or elements and/or method steps shown and/or described in connection with any disclosed form or embodiment of the invention and equivalents thereof may be incorporated in any other disclosed or described or suggested form or embodiment as a general matter of design choice. It is the intention, therefore, to be limited only as indicated by the scope of the claims appended hereto.

What is claimed is:

1. A method of selling international travel tickets in combination with duty free items from a single merchant, comprising the steps of:

offering to sell to a customer, via a computing device associated with said merchant over a computer network, a specific international travel ticket for travel with a first passenger carrier at a discounted price and one or more specific duty free items;

in conjunction with said offer to sell said specific international travel ticket at said discounted price, the computing device requiring said customer to select for purchase as part of a single transaction both the specific international travel ticket and at least one specific duty free item selected from a group of one or more specific duty free items, the at least one specific duty free item to be delivered to the customer at or near an exit point or on board the passenger carrier during the travel associated with the specific international travel ticket said merchant having arranged with the first passenger carrier for delivery of the at least one specific duty free item to said customer during the travel associated with said specific international travel ticket without the merchant being required to pay at least a portion of a concession fee otherwise charged by the first passenger carrier to merchants for selling or delivering such duty free items;

acknowledging, via the computing device, said customer's decision to purchase said specific international travel ticket and said at least one specific duty free item, the acknowledgment being made over said computer network;

accepting, via the computing device, payment over said computer network from said customer for said specific international travel ticket and said specific duty free item;

arranging for delivery, using the computing device, of said specific international travel ticket to said customer;

advising, via the computing device, said customer of the method of delivery of said specific duty free item to said customer, said method of delivery being connected to said customer engaging in the international travel associated with said specific international travel ticket; and determining, via the computing device, the discounted price of said specific international travel ticket based at least in part on a dollar value of one or more duty free items which are or must be purchased from the merchant such that the portion of the concession fee not paid by the merchant on the dollar value is sufficient to allow the merchant to sell the specific international ticket at the discounted price.

2. The method of claim 1, wherein said step of offering to sell said specific international travel ticket comprises offering to sell one or more of a plurality of specific international travel tickets which differ in at least one of their itineraries and destinations.

3. The method of claim 1, wherein the members of said group each have a predetermined maximum assigned value which is dependent on the price of said specific international travel ticket selected for purchase by said customer.

4. The method of claim 3, further comprising the steps of said customer selecting at least one specific international travel ticket from among said plurality of specific international travel tickets and selecting at least one specific duty free item from said group of specific duty free items.

5. The method of claim 4, wherein said step of said customer selecting said at least one specific international travel ticket further comprises the step of said customer viewing itinerary and pricing information concerning said selection of specific international travel tickets by accessing a first web site over said computer network.

6. The method of claim 5, wherein said step of said customer selecting said at least one specific duty free item further comprises the step of said customer viewing descriptive information concerning said selection of specific duty free items by accessing a second web site over said computer network.

7. The method of claim 6, further comprising the step of said customer making payment for said at least one specific international travel ticket by providing credit card information to the computing device over said computer network.

8. The method of claim 7, further comprising the step of said customer providing at least one of an address, phone number, email address and a passport number to the computing device over said computer network.

9. The method of claim 1, wherein said step of advising said customer of the method of delivery of said at least one specific duty free item comprises advising said customer that said at least one specific duty free item will be delivered to said customer at one of an international port of departure, an international port of arrival and during international travel, whereby said at least one specific duty free item qualifies for duty free status.

10. The method of claim 1, wherein offering to sell to a customer at least one specific international travel ticket comprises offering to sell at least one specific air travel ticket.

11. The method of claim 1, wherein requiring the customer to select at least one specific duty free item comprises advising the customer of a dollar value of duty free merchandise which must be purchased to purchase the at least one specific international travel ticket at the offering price.

12. The method of claim 1, wherein requiring the customer to select at least one specific duty free item comprises advising the customer of a dollar value of duty free merchandise which must be purchased to purchase the at least one specific international travel ticket at no additional cost to the dollar value of duty free merchandise.

13. A method of selling duty free items in combination with international travel tickets from a single merchant, comprising:

offering to sell to a customer, via a computing device over a computer network, at least one of a plurality of specific duty free items at an offering price;

in conjunction with said offer to sell said at least one specific duty free item at said offering price, the computing device requiring said customer to select for purchase as part of a single transaction both the specific duty free item and at least one specific international travel ticket to be selected from the group of one or more specific international travel tickets, the at least one specific duty free item to be delivered to the customer at or near an exit point or on board the passenger carrier during the travel associated with said at least one-specific international travel ticket said merchant having arranged with the first passenger carrier for delivery of the at least one specific duty free item to said customer during the travel associated with said at least one specific international travel ticket without the merchant being required to pay at least a portion of a concession fee otherwise charged by the passenger carrier to merchants for selling or delivering such duty free items;

acknowledging, via the computing device, said customer's decision to purchase said at least one specific duty free item and said at least one specific international travel ticket, the acknowledgment being made over said computer network;

accepting, via the computing device, payment over said computer network from said customer for said at least one specific duty free item;

advising, via the computing device, said customer of the method of delivery of said at least one specific duty free item to said customer; said method of delivery being connected to said customer engaging in the international travel associated with said at least one specific international travel ticket;

arranging for delivery, using the computing device, of said at least one specific international travel ticket to said customer; and determining, via the computing device, the offering price of said at least one specific duty free item such that the portion of the concession fee not paid by the merchant on the offering price is sufficient to allow the merchant to sell the specific international travel ticket.

14. The method of claim 13, wherein said step of offering to sell said at least one specific duty free item comprises offering to sell one or more of a plurality of specific duty free items.

15. The method of claim 14, wherein the members of said group each have a predetermined maximum assigned value which is dependent on the price of said at least one specific duty free item selected for purchase by said customer.

16. The method of claim 15, further comprising the steps of said customer selecting at least one specific duty free item from among said plurality of specific duty free items and selecting at least one specific international travel ticket from said group of specific international travel tickets.

17. The method of claim 16, wherein said step of said customer selecting said at least one specific duty free item further comprises the step of said customer viewing descriptive and pricing information concerning said selection of specific duty free items by accessing a first web site over said computer network.

18. The method of claim 17, wherein said step of said customer selecting said at least one specific international travel ticket further comprises the step of said customer viewing itinerary information concerning said selection of specific international travel tickets by accessing a second web site over said computer network.

19. The method of claim 18, further comprising the step of said customer making payment for said at least one specific duty free item by providing credit card information to a first remote computer the computing device over said computer network.

20. The method of claim 19, further comprising the step of said customer providing at least one of an address, phone number, email address and a passport number to the computing device over said computer network.

21. The method of claim 13, wherein said step of advising said customer of the method of delivery of said at least one specific duty free item comprises advising said customer that said at least one specific duty free item will be delivered to said customer at one of an international port of departure, an international port of arrival and during international travel, whereby said at least one specific duty free item qualifies for duty free status.

22. A computer implemented method for offering a combination of an international travel ticket and a duty free item to a consumer, the method comprising:
offering, via a merchant server, a plurality of international travel tickets and a plurality of duty free items to a customer;
allowing, via the merchant server, the customer to select at least one of the international travel tickets for travel on a first passenger carrier or at least one of the duty free items for purchase;
if the customer has selected at least one of the international travel tickets, the merchant server requiring the customer to select at least one of the duty free items to obtain in combination with the selected international travel ticket at a first price;
if the customer has selected at least one of the duty free items, the merchant server requiring the customer to select at least one of the international travel tickets to obtain in combination with the selected duty free item at a second price;
selling, via the merchant server, the at least one selected international travel tickets and the at least one selected duty free items to the customer in a single transaction; and
arranging for delivery, using the merchant server, of the at least one selected duty free items to the customer in association with the customer's travel using the at least one selected international travel tickets at or near an exit point or on board the first passenger carrier;
wherein the first price and the second price are each determined such that at least a portion of a concession fee otherwise charged by the first passenger carrier to merchants for selling or delivering such duty free items is not included in the first and second prices.

23. The method of claim 22, wherein requiring the customer to select at least one of the duty free items comprises matching one or more of the plurality of duty free items to the at least one selected international travel ticket and offering the matching one or more duty free items to the customer.

24. The method of claim 23, wherein matching comprises matching one or more duty free items to the at least one selected international travel ticket based on a price of the international travel ticket.

25. The method of claim 22, wherein requiring the customer to select at least one of the international travel tickets comprises matching one or more of the plurality of international travel tickets to the at least one selected duty free item and offering the matching one or more international travel tickets to the customer.

26. The method of claim 25, wherein matching comprises matching one or more international travel tickets to the at least one selected duty free item based on a price of the selected duty free item.

27. The method of claim 22, wherein offering a plurality of international travel tickets and a plurality of duty free items to a customer comprises purchasing the international travel tickets and the duty free items from third parties and offering the purchased international travel tickets and duty free items to the customer.

28. The method of claim 27, wherein purchasing the international travel tickets and the duty free items from third parties comprises conditionally purchasing the international travel tickets and the duty free items from third parties before offering them to the customer.

29. The method of claim 22, wherein offering a plurality of international travel tickets comprises offering air travel tickets.

\* \* \* \* \*